(12) United States Patent
Loukas (10) Patent No.: US 7,130,306 B1
(45) Date of Patent: Oct. 31, 2006

(54) PULSE GROUP SOLITON TRANSMISSION

(76) Inventor: Pasi Into Loukas, Kemintie 969, Rovaniemi (FI) 96700

(*) Notice: Subject to any disclaimer, the term of this patent is extended or adjusted under 35 U.S.C. 154(b) by 926 days.

(21) Appl. No.: 09/973,537

(22) Filed: Oct. 9, 2001

Related U.S. Application Data

(60) Provisional application No. 60/242,696, filed on Oct. 25, 2000.

(51) Int. Cl.
*H04J 14/00* (2006.01)
(52) U.S. Cl. .................. 370/392; 370/475; 398/80
(58) Field of Classification Search ............ 370/212, 370/213, 392, 474, 475; 398/80, 146, 179
See application file for complete search history.

(56) References Cited

U.S. PATENT DOCUMENTS

| | | | | |
|---|---|---|---|---|
| 5,095,487 A | * | 3/1992 | Meyerhofer et al. | ........... 372/23 |
| 5,323,260 A | * | 6/1994 | Alfano et al. | ............... 359/244 |
| 5,872,783 A | * | 2/1999 | Chin | ...................... 370/395.32 |
| 6,594,268 B1 | * | 7/2003 | Aukia et al. | ................ 370/400 |
| 6,598,034 B1 | * | 7/2003 | Kloth | ........................... 706/47 |
| 6,614,795 B1 | * | 9/2003 | Jimmei et al. | ............... 370/401 |
| 6,778,536 B1 | * | 8/2004 | Ofek et al. | .............. 370/395.4 |

FOREIGN PATENT DOCUMENTS

| WO | WO 00/56024 A3 | * | 9/2000 |
|---|---|---|---|
| WO | WO 01/37495 A1 | * | 5/2001 |

* cited by examiner

*Primary Examiner*—Melvin Marcelo (57) ABSTRACT

A soliton transmission method where groups of partially overlapping short pulses are sent as solitons. Such pulses are laser pulses or any other electromagnetic radiation pulses having a same wavelength. The pulses in the pulse groups can be modulated both individually as well as collectively as a group. The present invention introduces also data packets based on such pulse group solitons. It is also introduced a packet switching system for packet based networks, where the packets are switched according to delivery address predictions. In said packet switching system, the node computers boost the accuracy of the packet delivery address predictions by interleaving the switched packets so that their delivery addresses follow regular patterns in the relayed packet trains. In said packet switching system, it is also introduced two different switching methods which use packet tags to denote the delivery addresses of packets.

16 Claims, 5 Drawing Sheets

FIG. 15 time

FIG. 16 ness of the pulse groups, i.e. fusitons, in soliton transmissions. The fusitons work as data packets themselves. Data packets can be modulated individually in much more ways compared to single pulse solitons. A long fiber-optic WDM transmission channel can transfer thus essentially more data in same time by using fusitons instead of conventional single pulse solitons.

PULSE GROUP SOLITON TRANSMISSION

Claims the benefit of provisional application No. 60/242, 696 filed Oct. 25, 2000.

RELATED APPLICATIONS

U.S. Patent Documents
  U.S. Pat. No. 5,095,487 March, 1992 Meyerhofer et al.
  U.S. Pat. No. 5,872,783 February, 1999 Chin
Foreign Patent Documents
  WO0056024 September, 2000 Kadambi et al.
  WO0137495 May, 2001 Malalur

BACKGROUND OF THE INVENTION

Soliton transmission technologies have become the most important field of research in optical communications. The aim of the present invention is to provide a soliton transmission method with enhanced data transfer rate especially for long range WDM based fiber-optic communications. This is done by introducing solitons which consist of multiple partially overlapping short pulses. Other aim is to provide data packets which are based on such pulse group solitons, and also introduce a new kind of packet switching system.

DESCRIPTION OF THE PRIOR ART

Solitons are commonly used in fiber-optic telecommunications. Overlapping pulses have been used in both wireline and fiber-optic communications in some extent. One application for overlapping pulses has been the doubling of transfer capacity in old modem communications using pulse-pairs consisting of two overlapping pulses. Different shapes of solitons have been studied, but there apparently is no mention in the prior art of the kind of soliton introduced herein.

In the known packet switching systems for packet based networks, it has been commonly used virtual channels to speed up the packet delivery process. The present invention introduces a packet switching system where it is used a predictive packet switching method to offer a more flexible solution for complex wide area networks, and especially for heavily congested nodes therein. The present invention introduces also two different packet switching methods which use packet tags to denote the delivery addresses of packets. These tag based switching methods resemble somewhat the switching systems introduced in the U.S. Pat. No. 5,872,783, and the patents WO0056024 and WO0137495.

SUMMARY OF THE INVENTION

A soliton transmission method where groups of partially overlapping short pulses are sent as solitons. Such pulses are laser pulses or any other electromagnetic radiation pulses having a same wavelength. The pulses in the pulse groups can be modulated both individually as well as collectively as a group. The present invention introduces also data packets based on such pulse group solitons. It is also introduced a packet switching system for packet based networks, where the packets are switched according to delivery address predictions. In said packet switching system, the node computers boost the accuracy of the packet delivery address predictions by interleaving the switched packets so that their delivery addresses follow regular patterns in the relayed packet trains. In said packet switching system, it is also introduced two different switching methods which use packet tags to denote the delivery addresses of packets.

DESCRIPTION OF THE DRAWINGS

FIG. 7: Example. The pulse groups, i.e. fusitons, itself are modulated optionally with position and/or phase modulation (above in figure; above right is shown pulses P1, P2 and P3 as a group in a different position or phase compared to the position/phase of the same group in above left in figure), optionally with width modulation with respect to the width of the fusiton (below left in figure, w1 representing the width of the fusiton consisting of pulses P1, P2 and P3) or with respect to the average width of the pulses in the fusiton (below left in figure, w2 representing the average width of the pulses P1, P2 and P3 in the fusiton), and optionally with amplitude modulation with respect to the highest amplitude of the pulses in the fusiton (below right in figure, h1 representing the highest amplitude of the pulses P1, P2 and P3 in the fusiton) or with respect to the average amplitude of the pulses in the fusiton (below right in figure, h2 representing the average amplitude of the pulses P1, P2 and P3 in the fusiton).

FIG. 11: Example. Node computer NA receives data packets from node computers NB, NC and ND. The packets have three types of delivery addresses: X, Y and Z; the packets being labeled respectively. Said delivery addresses are intermediate or final delivery addresses. The node computer NA interleaves the packet trains received from the node computers NB, NC and ND and relays them as a single packet train to another downstream node computer. The node computer NA arranges the received packets to the relayed packet train so that they occur as much as possible following certain patterns. TN in the figure is an example of a relayed packet train formed without any pattern arrangement using simple interleaving for the received packets in the order: NB first (Z), NC first (Y), ND first (X), NB second (Y), NC second (X), ND second (Z), NB third (X), NC third (Z), ND third (Y). T1 in the figures is an example of a relayed packet train formed using pattern arrangement for the received packets so that first, second and third packets of the node computers NB, NC and ND have been arranged to the formation X, Y, Z repeatedly. T2 in the figure is an example of a relayed packet train formed using pattern arrangement for the received packets so that for the node computer NB has been reserved twice as much bandwidth as for the node computers NC and ND, arranging the packets in the order: NB first (Z) and second (Y), NC first (Y), ND first (X), NB third (X) and imagined fourth (Z), ND second (Z), NC second (X), NB imagined fifth (X) and imagined sixth (Y), ND third (Y), NC third (Z).

DETAILED DESCRIPTION

Figure 1:
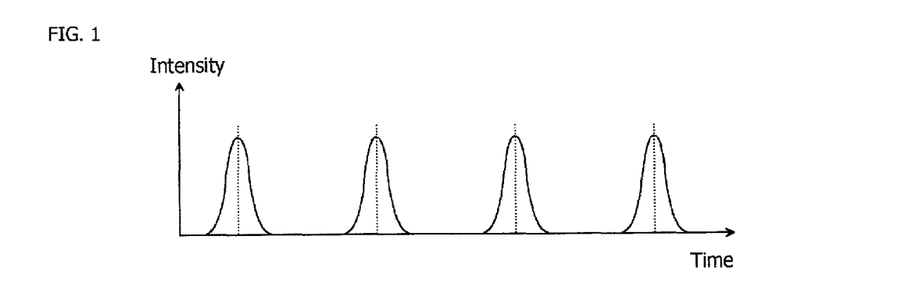
FIG. 1: Conventional soliton transmission applying brief laser pulses modulated with e.g. phase modulation.
Figure 2:
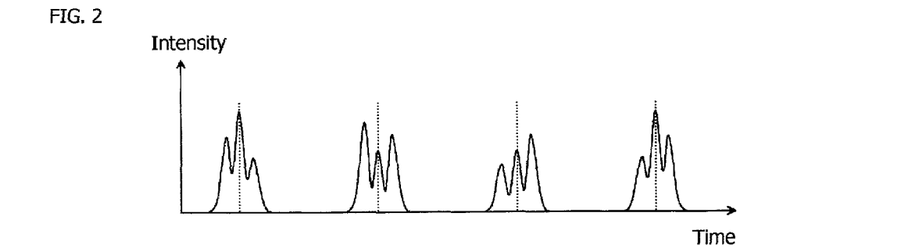
FIG. 2: Example. Pulse groups, in this case each consisting of three brief pulses, are sent as solitons, such pulse group soliton called here a "fusiton". The fusitons look different compared to each other, because the pulses inside them are modulated individually and independently.
Figure 3:
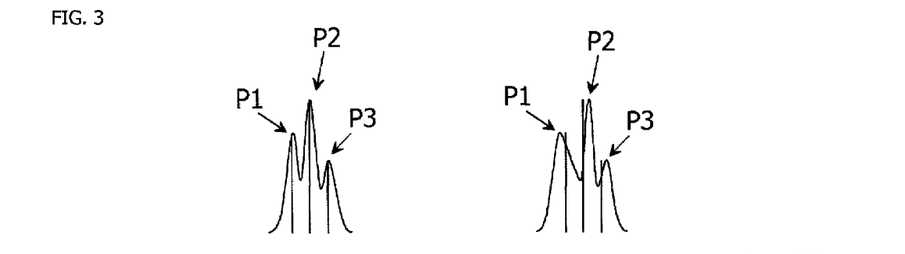
FIG. 3: Example. The pulses in a fusiton are optionally modulated individually with position and/or phase modulation. Right in the figure is shown pulses P1, P2 and P3 in different positions or phases compared to the positions/phases of the same pulses in the left in the figure.
Figure 4:
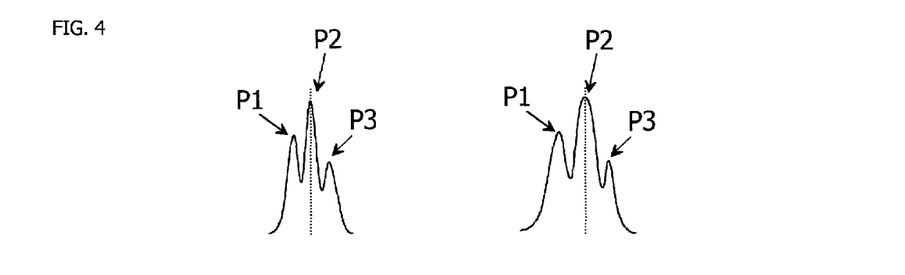
FIG. 4: Example. The pulses in a fusiton are optionally modulated individually with width modulation. Right in the figure is shown pules P1, P2, and P3 in different widths compared to the widths of the same pulses in the left in the figure.
Figure 5:
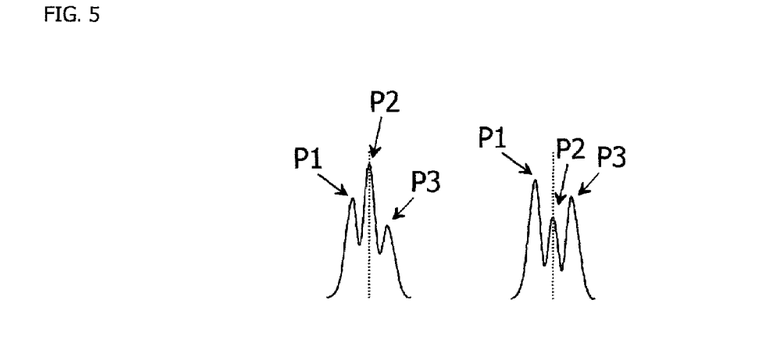
FIG. 5: Example. The pulses in a fusiton are optionally modulated individually with amplitude modulation. Right in the figure is shown pulses P1, P2, and P3 having different amplitudes compared to the amplitudes of the same pulses in the left in the figure.
Figure 6:
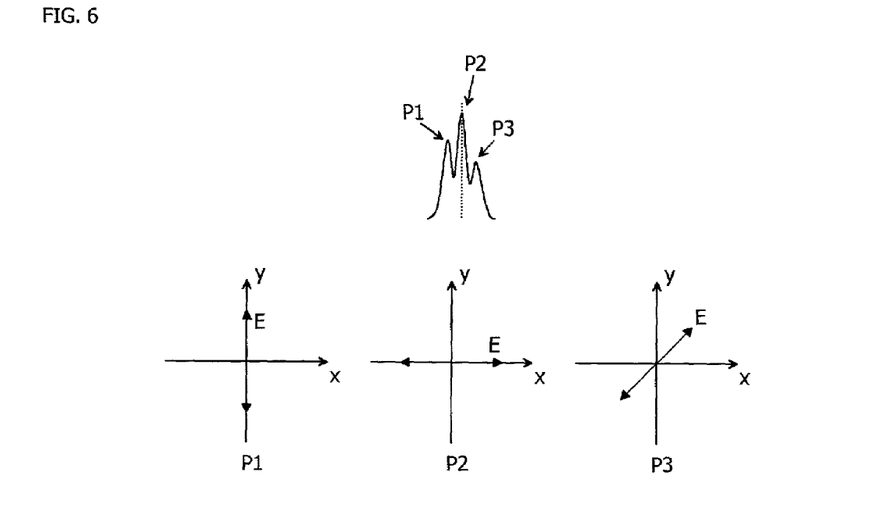
FIG. 6: Example. The pulses in a fusiton are optionally modulated individually with polarization modulation. In the figure is shown pulses P1, P2 and P3 with different polarization states (P1 having vertical polarization, P2 having horizontal polarization, and P3 having 45 degree rotated polarization).
Figure 7:
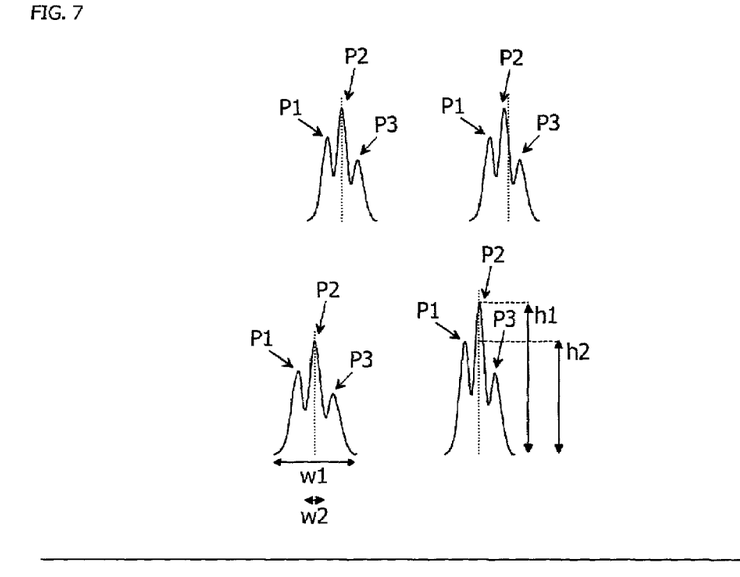
Figure 8:
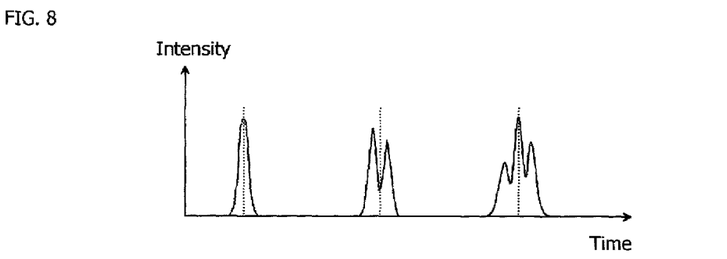
FIG. 8: Example. The fusitons are optionally modulated with pulse number modulation with respect to the number of pulses in the fusiton. In the figure is depicted three fusitons, first having one pulse and being therefor an ordinary soliton, second having two pulses and third having three pulses.
Figure 9:
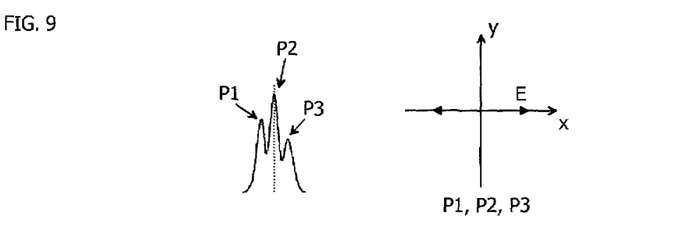
FIG. 9: Example. The fusitons itself are optionally modulated with polarization modulation if the pulses in the fusitons are not independently polarization modulated. In the figure, the pulses P1, P2 and P3 forming the fusiton have all the same polarization state, horizontal polarization.

Two or more short pulses are put together to form a group of overlapping pulses, which is then sent as a soliton. Such pulse group soliton is called here a "fusiton". Said pulses are electromagnetic radiation pulses, such as laser light pulses, and have a same wavelength. Said fusitons are used in data transmission by repeating them in a pulse train, like in conventional soliton transmission (refer FIG. 1). Said fusitons are encoded with data by modulating individual pulses in a fusiton, or by modulating the pulse group forming a fusiton (refer FIG. 2). Individual pulses in a fusiton are modulated by using either A) position modulation (refer FIG. 3), B) phase modulation (refer FIG. 3), C) width modulation (refer FIG. 4), D) amplitude modulation (refer FIG. 5), E) polarization modulation (refer FIG. 6), or any combination of the modulation methods A through E. A fusiton is optionally modulated either by G) position modulation (refer FIG. 7), H) phase modulation (refer FIG. 7), I) width modulation with respect to the width of the fusiton (refer FIG. 7), J) width modulation with respect to the average width of the pulses in the fusiton (refer FIG. 7), K) amplitude modulation with respect to the highest amplitude of the pulses in the fusiton (refer FIG. 7), L) amplitude modulation with respect to the average amplitude of the pulses in the fusiton (refer FIG. 7), M) pulse number modulation with respect to the number of pulses in the fusiton (refer FIG. 8), or any combination of the modulation methods G through M. If individual pulses in a fusiton are not polarization modulated, then such fusiton itself is optionally modulated with polarization modulation in addition to other used modulations (refer FIG. 9).

Said fusitons are optionally used as components of data packets in packet based networks, like the internet, one or more said fusitons forming one data packet. In optical transmission said fusiton based data packets are optionally switched optically with respect to the polarization states of pulses forming the fusitons in a data packet.

Figure 10:
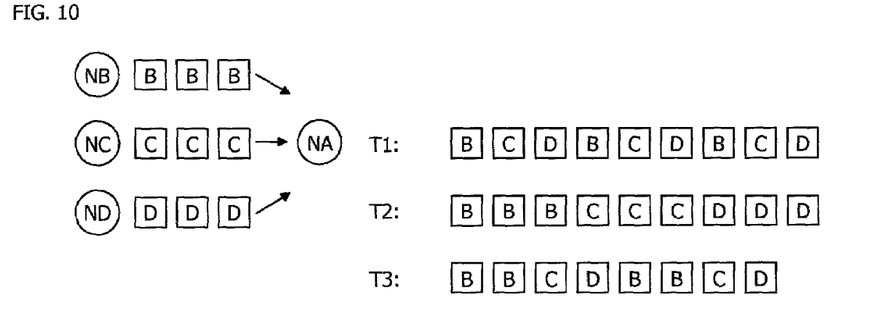
FIG. 10: Example. Node computer NA receives data packets from node computers NB (B-packets), NC (C-packets) and ND (D-packets). Assuming that each packet train coming from the node computers NB, NC and ND exhibit distinct patterns and frequencies in occurrences of packet delivery addresses or other packet properties, it is useful not to scramble the packet trains together but to interleave the packets in them in distinguishable formations in a relayed packet train consisting of packets received from multiple node computers. In the figure, node computer NA relays packets trains received from node computers NB, NC and ND as a single packet train to another downstream node computer. Packet trains T1, T2 and T3 are examples of said relayed single packet train with different types of interleaving.
Figure 11:
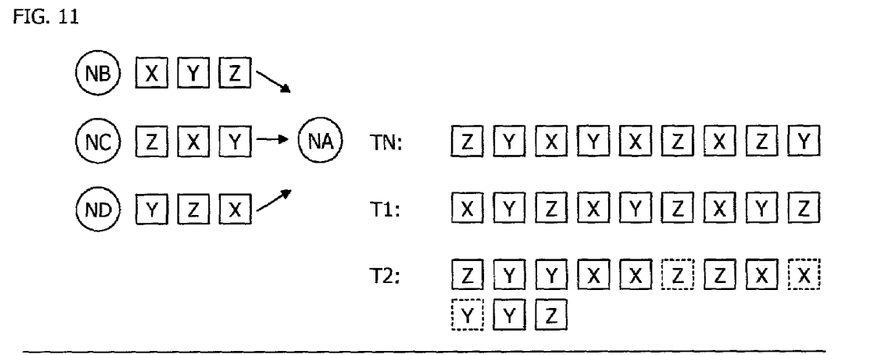

Said fusiton based data packets are optionally switched according to a probability synchronized packet switching system for packet based networks, especially for wide area networks, like the internet. In said switching system the node computers switching and routing data packets analyze and harness regularities in the packet traffic to speed up the packet delivery process. The node computers interleave incoming packets from other node computers with respect to the delivery addresses and/or delivery routes of said packets, or with respect to said other node computers itself, so that the positions of said packets in the relayed packet train follow any kind of predictable pattern or algorithm (refer FIGS. 10 and 11). The node computers use said predictability of packet locations in a packet train to switch and route as many packets as possible without reading or checking their delivery addresses, what is useful especially in discharging congestion in node computers having higher susceptibility to traffic jamming than other node computers.

Figure 12:
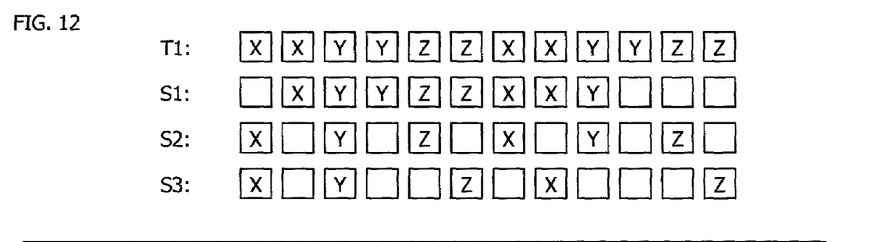
FIG. 12: Example. Samples S1, S2 and S3 represent different types of sample picking patterns, the samples consisting of packet types X, Y and Z (differentiated with packet delivery addresses) picked from a packet train T1. S1 has continuous, S2 a two-step and S3 a little irregular pattern.

The node computers switch the relayed packets to outgoing ports on the basis of delivery addresses or delivery address predictions for said packets. The node computers use a delivery address prediction method wherein a node computer reads delivery addresses of certain percentage or certain number of packets, said sample packets picked in algorithmic or random order from an incoming packet train received from other node computer, that sampled delivery address information being used for predicting intermediate and final delivery addresses for the probabilistically relayed packets which delivery addresses are not read in said packet train (refer FIG. 12). The node computers use also information about all possible intermediate routes through node computers which lead to said delivery addresses in said sampled delivery address information, to predict the intermediate and final delivery addresses for said probabilistically relayed packets. After a node computer has determined the most probable intermediate or final delivery address to certain said probabilistically relayed packets, the node computer switches said packets to respective outgoing port(s) leading to said delivery address. The node computers choose and use in said delivery address prediction method certain predictive patterns or algorithms which predict best the delivery addresses of said probabilistically relayed packets on the basis of said sampled delivery address information. The node computers determine dynamically in real time ratings for the degree of delivery address prediction reliability (DDAPR) for said probabilistically relayed packets or packet groups, such ratings chosen on the basis of a goodness of fit which defines how well the intermediate and final delivery addresses of the most recent said sample packets picked from an incoming packet train follow a said chosen predictive pattern or algorithm, and how well certain of said probabilistically relayed packets' intermediate and final delivery addresses can be predicted using a said chosen predictive pattern or algorithm. The node computers optionally sample more packets in said delivery address prediction method when the calculated DDAPR(s) is lower. In the simplest prediction case, a node computer calculates simple probability on the basis of sampled packet delivery addresses for the outcome that certain packets chosen for probabilistic relay in an incoming packet train have a same delivery address, said probability being the DDAPR for said probabilistically relayed packets.

Figure 13:
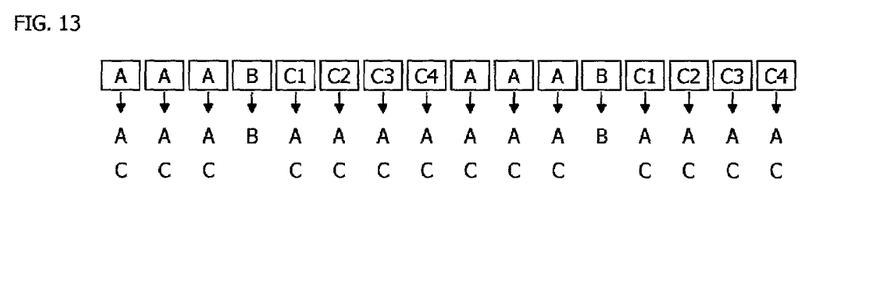
FIG. 13: Example. A packet train has channels for the type A (denoting the packets which delivery addresses have been read by the sending computer), B (denoting the packets for which it must not be used said delivery address prediction method) and C (denoting the DDAPR categorized packets) packet channels. There are four C type channels: C1, C2, C3 and C4, each carrying packets with a different DDAPR. When a node computer receives said packet train, A type packets (packets belonging to an A type channel) are relayed normally either as A or C type packets, B type packets are relayed as B type packets, and C type packets either as A or C type packets. Typically, also C type packets with poor new and old DDAPR are relayed as B type packets.

The node computers divide the incoming and outgoing packet trains to packet channels so that it is reserved A) a separate channel for the packets which delivery addresses have been read, B) a separate channel for the packets which delivery addresses have been read and for which it must not be used said delivery address prediction method, and C) multiple separate channels for said probabilistically relayed packets, each of said multiple channels delivering packet trains with different rating for the DDAPR. When the node computers receive said channeled type A and C packet trains, they use said delivery address prediction method which uses said dynamical DDAPR calculation relaying the packets in said packet trains as said type A, B or C packet trains (refer FIG. 13). When the node computers receive said channeled type C packet trains, the packets chosen for probabilistic relay in said trains are given new said dynamical DDAPR ratings which are optionally adjusted with the old DDAPR ratings which said packet trains already have when received. In said adjustment a said determined new dynamical DDAPR rating is lowered by a certain amount relative to a said old DDAPR rating of a said type C packet train channel having the packet or packet group for which said new dynamical DDAPR rating was determined. Said old DDAPR ratings itself are optionally lowered certain amount for said received channeled type C packet trains to take account the effect of the degrading of validity of DDAPR when packets travel more times between node computers without their delivery addresses being read. The node computers read delivery addresses of all packets with too low DDAPR, and relay them through said type A or B packet train channels. The node computers optionally reserve more bandwidth (transfer capacity) for said type C packet train channels which have higher DDAPR ratings.

The node computers use in said delivery address prediction method optionally also regularities in occurrences of packet source addresses, packet content types or other packet properties in received packet trains to predict the intermediate and final delivery addresses for the packets in said packet trains. When said optional packet delivery address prediction is used, the node computers interleave packets from received packet trains so that the packet source addresses, packet content types or other packet properties in the relayed interleaved packet trains occur as much as possible following certain predictable patterns or algorithms.

The node computers predict the intermediate and final delivery addresses of packets in received packet trains optionally also by reading only partly a delivery address, source address, content type description or other property of each of or some of said sample packets in said packet trains, and using that information in said prediction.

The node computers optionally send to each other information about the occurrence regularities/algorithms and occurrence probabilities of packet delivery addresses, packet source addresses or other packet properties in the packet traffic between the node computers to avoid unnecessary sampling of packets in incoming packet trains, to better predict packet delivery addresses and to switch as many packets as possible without reading their delivery addresses or other properties.

In order to form regularities to the packet traffic, the node computers optionally deliver through certain node computers or through certain routes via node computers the packets which have certain types of intermediate or final delivery addresses, source addresses, content, or other properties. In order to control the overall capacity usage of the network of the node computers, the node computers optionally deliver through certain node computers or through certain routes via node computers said channeled type C packet trains with certain DDAPR ratings.

Figure 14:
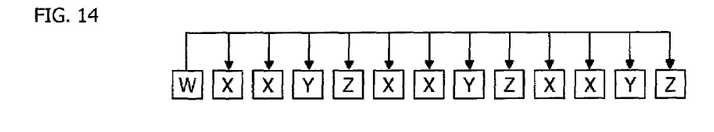
FIG. 14: Example. Packet W in a packet train contains information about the subsequent packets of type X, Y and Z (packets differentiated with respect to their intermediate or final delivery addresses, or other properties) coming after the packet in the same packet train, specifying their number and pattern of occurrence.

The node computers optionally deliver data packets according to a system, wherein in the header or other section of a packet is written occurrence information about the delivery addresses or other properties of the subsequent packets in the packet train containing said packet (refer FIG. 14). Said occurrence information is written by the node computers whenever it is needed. Said occurrence information is read by the first switching node computer which receives the packet holding said occurrence information directly from the node computer which has written said occurrence information. When receiving a packet containing said occurrence information the node computers read and use it, and either write over said used occurrence information with new occurrence information or empty information, or write in said packet an identifier which denotes that said used occurrence information is obsolete. Said occurrence information tells how many and/or what packets have certain or certain type of intermediate or final delivery addresses, or other properties. Said occurrence information appoints the packets to which it refers by a certain pattern or algorithm according to which said packets are picked from said packet train. Said occurrence information is used in said delivery address prediction method to predict intermediate or final delivery addresses of packets, or independently with or without said delivery address prediction method for switching as many packets as possible without reading their delivery addresses.

Figure 15:
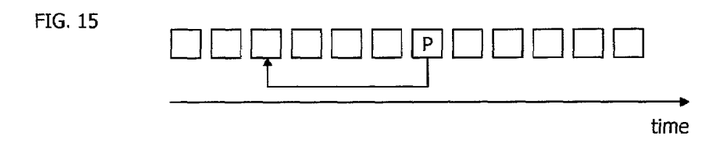
FIG. 15: Example. Packet P has a referring pointer referring to a specific packet ahead of the packet in the same packet train, the delivery address or other property of said referred packet being used as the delivery address or other property of said referring packet.
Figure 16:
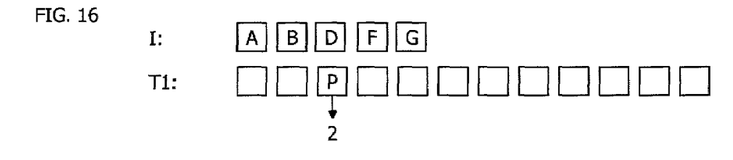
FIG. 16: Example. Packet train T1 contains a packet P which has a referring pointer referring to the second cell (B) in the index I of the most frequent packet delivery addresses or other properties occurring in the packet traffic between two node computers, said traffic carrying also the packet train T1. Said property B in the second cell of the index I is used as the delivery address or other property of the packet P.

The node computers optionally deliver data packets according to a system, wherein in the header or other section of a packet is written a referring pointer denoting the intermediate or final delivery address, or other property of that packet containing said referring pointer. Said referring pointer refers either E) to an intermediate or final delivery address, or other property of a specific packet among the number n latest packets residing in the same packet train before said packet holding said referring pointer (refer FIG. 15), or F) to a specific intermediate or final delivery address, or other packet property in an index of the most frequent recent intermediate or final delivery addresses, or other packet properties which have occurred in the packet traffic between two node computers carrying also said referring pointer holding packet (refer FIG. 16). A said referred delivery address or other property E or F is used as the delivery address or other property of the packet containing said referring pointer. Said referring pointer is written by the node computers whenever it is needed. Said referring pointer is read by the first switching node computer which receives the packet holding said referring pointer directly from the node computer which has written said referring pointer. When receiving a packet containing said referring pointer the node computers read it and use it in delivery address or other property determination of said packet, and either write over said used referring pointer with new referring pointer or empty information, or write in said packet an identifier which denotes that said used referring pointer is obsolete. Some node computers optionally form groups, each group having a common said F type index for said F type delivery address or other packet property referring, which contains the most frequent recent intermediate or final delivery addresses, or other packet properties having occurred in the packet traffic in said node computer group. In said node computer group, the node computers deliver to each other information about said most frequent recent intermediate or final delivery addresses, or other packet properties to form identical said F type indices. When said F type common index system is used for node computer groups, the node computers in a group do not write over or mark as obsolete said F type referring pointers after reading and using them, instead said F type referring pointers are used again by other node computers inside said group along the route of the packet holding said F type referring pointer. When said F type common index system is used for node computer groups, outside of the groups is used said two node computer referring pointer system if any. Said two node computer referring pointer system and said node computer group referring pointer system are used in said delivery address prediction method to predict intermediate or final delivery addresses of packets, or independently with or without said delivery address prediction method for switching as many packets as possible without reading their delivery addresses.

What is claimed is:

1. A soliton transmission method, comprising:
    forming a group of two or more partially overlapping short pulses, said pulses being electromagnetic radiation pulses and having a significantly same wavelength to stay as a group;
    transmitting data by sending such pulse group(s) as solitons, the data being encoded in said pulse groups by modulating:
        (a) individual pulses in a said pulse group,
        (b) and/or, the pulses of a said pulse group as a group;
    receiving said pulse groups and decoding the data carried by them.

2. A soliton transmission method according to claim 1, comprising:
    wherein individual pulses in a said pulse group are modulated by using one of the following:
        (a) position modulation,
        (b) phase modulation,
        (c) width modulation,
        (d) amplitude modulation,
        (e) polarization modulation;
    wherein a said pulse group itself is modulated by using one of the following:
        (a) position modulation,
        (b) phase modulation,
        (c) width modulation with respect to the width of said pulse group,
        (d) width modulation with respect to the average width of the pulses in said pulse group,
        (e) amplitude modulation with respect to the highest amplitude of the pulses in said pulse group,
        (f) amplitude modulation with respect to the average amplitude of the pulses in said pulse group,
        (g) pulse number modulation with respect to the number of pulses in said pulse group;
    wherein if individual pulses in a said pulse group are not polarization modulated, then said pulse group itself is optionally modulated with polarization modulation in addition to other used modulations.

3. A soliton transmission method according to claim 1, comprising:
    using said pulse groups as components of data packets in packet based networks.

4. A soliton transmission method according to claim 3, comprising:
    switching optically said pulse group based data packets with respect to the polarization states of the pulses in a pulse group.

5. A soliton transmission method according to claim 3, comprising:
    using the following packet switching method for switching said pulse group based data packets;
    a node computer sampling packets from incoming packet traffic, reading certain property(ies) of the sampled packets and predicting on the basis of said sampled property information the intermediate and/or final delivery addresses of the non-sampled packets;
    the node computer switching the non-sampled packets according to the respective delivery address predictions to the appropriate output ports.

6. A soliton transmission method according to claim 3, comprising:
    using the following packet switching method for switching said pulse group based data packets;
    transmitting an ad-hoc informant packet along with the packet traffic, the header or other section of said informant packet containing information which specifies the pattern according to which certain individual packets in the same packet traffic are mutually interleaved according to their plurality of different intermediate and/or final delivery addresses, said information individually distinguishing said packets and their addresses;

a node computer receiving said informant packet and using its information to distinguish said packets and their individual intermediate and/or final delivery addresses, and to switch said packets respectively to plurality of different appropriate output ports.

7. A soliton transmission method according to claim 3, comprising:

using the following packet switching method for switching said pulse group based data packets;

the header or other section of a packet containing a direct reference to another packet in the same packet train, said reference individually distinguishing the referred packet and specifying its location in the packet train;

a node computer reading said reference and using it to locate the referred packet in the packet train, and either:

(a) switching the referring packet to the appropriate output port according to a certain property of the referred packet, (b) or, switching the referred packet to the appropriate output port according to a certain property assigned for the referred packet in the referring packet;

wherein said certain property is an intermediate or final delivery address, or any data variable which has been specially assigned to guide the switching by its data value.

8. A packet switching method for packet based networks, comprising:

a node computer sampling packets from incoming packet traffic, reading certain property(ies) of the sampled packets and predicting on the basis of said sampled property information the intermediate and/or final delivery addresses of the non-sampled packets;

the node computer switching the non-sampled packets according to the respective delivery address predictions to the appropriate output ports.

9. A packet switching method according to claim 8, comprising:

wherein the node computer reads/resolves one or more of the following properties of a sampled packet:

(a) the delivery address,
(b) the source address,
(c) the delivery route,
(d) the content type,
(e) or, any data variable which has been specially assigned to guide the switching by its data value.

10. A packet switching method according to claim 8, comprising:

wherein the node computer reads only partly a sampled packet property.

11. A packet switching method according to claim 8, comprising:

wherein the node computer intentionally arranges the packets going to a specific output port so that their mutual positions in a packet train follow certain pattern(s) with respect to their intermediate or final delivery addresses, or data values of any data variable which has been specially assigned to guide the switching by its data value.

12. A packet switching method according to claim 11, comprising:

wherein the node computer reserves an own packet channel in a packet train going to a specific output port for each category of packets with a certain degree of predictability of intermediate or final delivery addresses, or data values of any data variable which has been specially assigned to guide the switching by its data value.

13. A packet routing method for packet based networks, comprising:

node computer(s) segregating the packet traffic using the following method:

a node computer delivering through different segregated routes in the network the packets which have a same intermediate or final delivery address, using the following method:

a node computer reading/resolving a packet's source address, content type or any data variable which has been specially assigned to guide the routing by its data value, and which does not constitute a delivery address or a reference to a delivery address;

the node computer choosing for said packet a route according to said read data variable from among plurality of routes of which each is dedicated to delivery packets which have certain value(s) of said read data variable assigned to that route, said route chosen also to be suitable with respect to the intermediate and/or final delivery address of said packet;

the node computer delivering said packet to go through said chosen route.

14. A packet switching method for packet based networks, comprising:

transmitting an ad-hoc informant packet along with the packet traffic, the header or other section of said informant packet containing information which specifies the pattern according to which certain individual packets in the same packet traffic are mutually interleaved according to their plurality of different intermediate and/or final delivery addresses, said information individually distinguishing said packets and their addresses;

a node computer receiving said informant packet and using its information to distinguish said packets and their individual intermediate and/or final delivery addresses, and to switch said packets respectively to plurality of different appropriate output ports.

15. A packet switching method for packet based networks, comprising:

the header or other section of a packet containing a direct reference to another packet in the same packet train, said reference individually distinguishing the referred packet and specifying its location in the packet train;

a node computer reading said reference and using it to locate the referred packet in the packet train, and either:

(a) switching the referring packet to the appropriate output port according to a certain property of the referred packet, (b) or, switching the referred packet to the appropriate output port according to a certain property assigned for the referred packet in the referring packet;

wherein said certain property is an intermediate or final delivery address, or any data variable which has been specially assigned to guide the switching by its data value.

16. A method for distinguishing dispersed packets, for packet based networks, comprising:

transmitting an ad-hoc informant packet along with the packet traffic, the header or other section of said informant packet containing information which specifies the pattern according to which the individual packets of a dispersed group of packets in the same packet traffic are interleaved with other packets of the packet traffic, said information individually distinguishing the dispersed packets of said group;

a node computer receiving said informant packet and using its information to distinguish said dispersed packets and to have a custom processing for them.

* * * * *